United States Patent
Vincent et al.

(10) Patent No.: US 11,697,442 B2
(45) Date of Patent: Jul. 11, 2023

(54) MONITORING AN AXLE OF A RAILWAY VEHICLE

(71) Applicant: Hitachi Rail Limited, London (GB)

(72) Inventors: David Vincent, Romsey (GB); Guy Rushton, Romsey (GB); Renfan Luo, Romsey (GB); Adam Wasenczuk, Romsey (GB); Marc Thomas, Romsey (GB); Matt Jones, Romsey (GB)

(73) Assignee: HITACHI RAIL LIMITED, London (GB)

( * ) Notice: Subject to any disclaimer, the term of this patent is extended or adjusted under 35 U.S.C. 154(b) by 270 days.

(21) Appl. No.: 16/759,568

(22) PCT Filed: Oct. 26, 2018

(86) PCT No.: PCT/EP2018/079511
§ 371 (c)(1),
(2) Date: Apr. 27, 2020

(87) PCT Pub. No.: WO2019/081770
PCT Pub. Date: May 2, 2019

(65) Prior Publication Data
US 2020/0290658 A1 Sep. 17, 2020

(30) Foreign Application Priority Data
Oct. 27, 2017 (GB) ...................... 1717699

(51) Int. Cl.
*B61L 15/00* (2006.01)
*G01H 1/06* (2006.01)
*G01M 17/10* (2006.01)

(52) U.S. Cl.
CPC ............ *B61L 15/0081* (2013.01); *G01H 1/06* (2013.01); *G01M 17/10* (2013.01)

(58) Field of Classification Search
CPC ....... B61L 15/0081; G01H 1/06; G01M 17/10
(Continued)

(56) References Cited

U.S. PATENT DOCUMENTS 3,929,308 A * 12/1975 Armstrong ............... B61K 9/04
246/169 A
5,433,111 A 7/1995 Hershey et al.
(Continued)

FOREIGN PATENT DOCUMENTS

| CN | 104990709 A | 10/2015 |
| CN | 106706119 A | 5/2017 |

(Continued)

OTHER PUBLICATIONS

Office Action for Japanese Application No. 2020-543720 dated Sep. 30, 2022 with English translation included (12 pages).

*Primary Examiner* — Aditya S Bhat
(74) *Attorney, Agent, or Firm* — J. Miguel Hernandez; James R. Gourley; Carstens, Allen & Gourley, LLP

(57) ABSTRACT

Apparatus for monitoring an axle of a wheelset assembly of a railway vehicle, the apparatus comprising a wireless sensor node fitted to a wheelset assembly, the wheelset assembly comprising an axle mounted between opposed wheels, each wheel being fitted to a respective opposite end of the axle, the wireless sensor node comprising a vibration energy harvester for converting mechanical energy from vibration in the wheelset assembly into electrical energy, a sensor for measuring a parameter, and a wireless transmitter for wirelessly transmitting the measured parameter or data associated therewith, and the apparatus further comprising a processor for processing the measured parameter to produce processed data, wherein the sensor is an accelerometer mounted to an end of the axle and the sensor and processor are arranged respectively to measure and process an axle (Continued)

percussion vibration frequency in the form of resonant vibration along the axle.

23 Claims, 2 Drawing Sheets

(58) Field of Classification Search
USPC .......................................................... 701/19
See application file for complete search history.

(56) References Cited

U.S. PATENT DOCUMENTS

| | | | |
|---|---|---|---|
| 2007/0208841 A1* | 9/2007 | Barone | B61L 15/0027 709/223 |
| 2009/0303076 A1 | 12/2009 | Setiadi et al. | |
| 2016/0152252 A1* | 6/2016 | Kim | B61L 15/0081 701/31.4 |
| 2016/0223390 A1 | 8/2016 | Lin | |
| 2019/0250069 A1* | 8/2019 | Samadani | F16C 19/527 |
| 2020/0353961 A1* | 11/2020 | Bonnes | G01S 5/01 |

FOREIGN PATENT DOCUMENTS

| | | |
|---|---|---|
| JP | 2001080481 A | 3/2001 |
| JP | 2006125976 A | 5/2006 |
| JP | 2007192828 A | 8/2007 |
| JP | 2013169965 A | 9/2013 |
| WO | 01/89903 A1 | 11/2001 |
| WO | 2011/117718 A1 | 9/2011 |

* cited by examiner

MONITORING AN AXLE OF A RAILWAY VEHICLE

CROSS REFERENCE TO RELATED APPLICATION

This application is a US 371 application from PCT/EP2018/079511 entitled "Monitoring an Axle of a Railway Vehicle" filed on Oct. 26, 2018 and published as WO 2019/081770 A1 on May 2, 2019, which claims priority to GB Application 1717699.1 filed on Oct. 27, 2017. The technical disclosures of every application and publication listed in this paragraph are hereby incorporated herein by reference.

The present invention provides an apparatus for monitoring an axle of a wheelset assembly of a railway vehicle. The present invention further provides a method for monitoring an axle of a wheelset assembly of a railway vehicle.

Rail axle fractures are one of the causes of major rail accidents throughout the history of rail, and started the study of metal fatigue. Preventing rail axle fractures in service causes significant additional maintenance work—both to carry out axle inspections and to repair damage after incorrect re-assembly of axle end apparatus after axle crack inspections.

There has been significant work to study the formation of axle cracks, in-service or with minimum intervention during maintenance, but there have been no successful trials of large deployment of axle crack monitoring equipment (in-service). This is partly due to the target crack-dependent measurands being intrinsically difficult to carry out in the context of all the other noise present in in-service trains, and also to the difficulty of monitoring rail axle end vibration and noise due to poor accessibility for energy and communication.

Recent development of vibration energy harvester powered wireless sensor nodes that are mounted on the axle end has solved part of this problem, but there is still the difficulty of differentiating additional vibration due to a fracture in the axle, from noise produced by the interaction of the wheel on the track, both of which have the same fundamental frequency driven from the rotation of the wheels at a given speed.

In the prior art, previous efforts to measure rail axle cracking have looked at either acoustic emissions from the fracture as the axle flexes, or the vibration caused by the axle flexing, and the change on the vibration as the crack extends. These tests have been on test rigs, not in an in-service test.

Vibration powered wireless sensor nodes (WSNs) have been used to detect bearing, track and wheel health on rail vehicles. The sensors monitor vibration, as discussed above, but the monitoring frequency is limited to 500 Hz.

There is therefore a need in the art for an apparatus for, and a method of, monitoring an axle of a wheelset assembly of a railway vehicle, which can provide an improved measurement as compared to known apparatus and methods.

There is also a need in the art for an apparatus for, and a method of, monitoring an axle of a wheelset assembly of a railway vehicle which can monitor an axle condition in-service, preferably in real-time.

There is a further need in the art for an apparatus for, and a method of, monitoring an axle of a wheelset assembly of a railway vehicle which can monitor an axle condition in-service, and can also provide at least one additional operating or performance parameter of the axle, again in-service, preferably in real-time.

The present invention at least partially aims to meet one or more of these needs.

Accordingly, the present invention provides an apparatus for monitoring an axle of a wheelset assembly of a railway vehicle, the apparatus comprising a wireless sensor node fitted to a wheelset assembly, the wheelset assembly comprising an axle mounted between opposed wheels, each wheel being fitted to a respective opposite end of the axle, the wireless sensor node comprising a vibration energy harvester for converting mechanical energy from vibration in the wheelset assembly into electrical energy, a sensor for measuring a parameter, and a wireless transmitter for wirelessly transmitting the measured parameter or data associated therewith, and the apparatus further comprising a processor for processing the measured parameter to produce processed data, wherein the sensor is an accelerometer mounted to an end of the axle and the sensor and processor are arranged respectively to measure and process an axle percussion vibration frequency in the form of resonant vibration along the axley.

The present invention further provides a method of monitoring an axle of a wheelset assembly of a railway vehicle, the wheelset assembly comprising an axle mounted between opposed wheels, each wheel being fitted to a respective opposite end of the axle, the method comprising the steps of:

a. providing a wireless sensor node fitted to the wheelset assembly, the wireless sensor node comprising a vibration energy harvester for converting mechanical energy from vibration in the wheelset assembly into electrical energy, a sensor for measuring a parameter, wherein the sensor is an accelerometer mounted to an end of the axle, and a wireless transmitter for wirelessly transmitting the measured parameter or data associated therewith;

b. while the railway vehicle is in motion, the vibration energy harvester receiving input vibration energy which is converted into electrical energy to power the wireless transmitter;

c. while the railway vehicle is in motion, measuring an axle percussion resonant vibration frequency using the sensor, wherein the sensor measures resonant vibration along the axle;

d. while the railway vehicle is in motion, wirelessly transmitting the measured axle percussion resonant vibration frequency or data associated therewith using the wireless transmitter; and e. processing the measured axle percussion vibration frequency of the resonant vibration along the axle to produce processed data.

Preferred features of the apparatus and method of the present invention are defined in the respective dependent claims.

The apparatus and method of the preferred embodiments of the present invention solve the problem of providing an in-service rail axle measurement, optionally in real-time, which can be utilized in a protocol for crack detection, and optionally also for axle load measurement. As the railway vehicle travels along the track, there are multiple impacts from wheel-rail interaction. The axle assembly vibrates in response to the impacts. The vibration-energy powered wireless sensor detects ringing of the wheelset stimulated by the wheel-rail interaction, analyses the vibration, and then transmits key parameters for further analysis.

The apparatus and method of the preferred embodiments of the present invention are predicated on the finding by the present inventors that a percussion vibration can be used to test the axle in-service, and that real-time measurement and analysis can be used to monitor axle condition and can also be used to measure axle loads.

The percussion vibration is caused by impacts on the wheelset assembly from the wheel/track interface. Therefore, the preferred embodiments utilise the effect of the "ringing" of the axle excited by wheel-rail impact to detect changes in axle health and load. The percussion vibration measurements are taken using axle end mounted accelerometers, powered by vibration energy harvesters.

The invention is based on the finding by the present inventors that wheel-rail impact, during an in-service period of the wheelset and measured in real-time, can be used to excite vibration of the wheelset, and in turn that vibration can be used to detect the state or condition of the axle, in particular the presence/absence of cracks in the axle and/or the axle loading.

In contrast, known axle testing methods have not used percussive vibration, in particular during an in-service period of the wheelset and measured in real-time, to diagnose axle condition and/or working/performance conditions such as axle load.

As discussed above, in the prior art, vibration powered wireless sensor nodes (WSNs) have been used to detect bearing, track and wheel health on rail vehicles, and the sensors monitor vibration, but the monitoring frequency is limited to 500 Hz, which is too low to detect axle percussive vibrations. When axle testing has previously been carried out on a test rig, there were no impacts to excite other modes of vibration, in particular a percussive mode of vibration.

In the preferred embodiments of the present invention, the percussive mode of vibration is typically within a frequency range of from 1000 to 2000 Hz, more typically from 1250 to 1750 Hz, for example about 1500 Hz. These frequencies are higher than the frequencies of up to 500 Hz used in known vibration powered wireless sensor nodes (WSNs) used to detect bearing, track and wheel health on rail vehicles.

Embodiments of the present invention will now be described, by way of example only, with reference to the accompanying drawings, in which.

Figure 1:
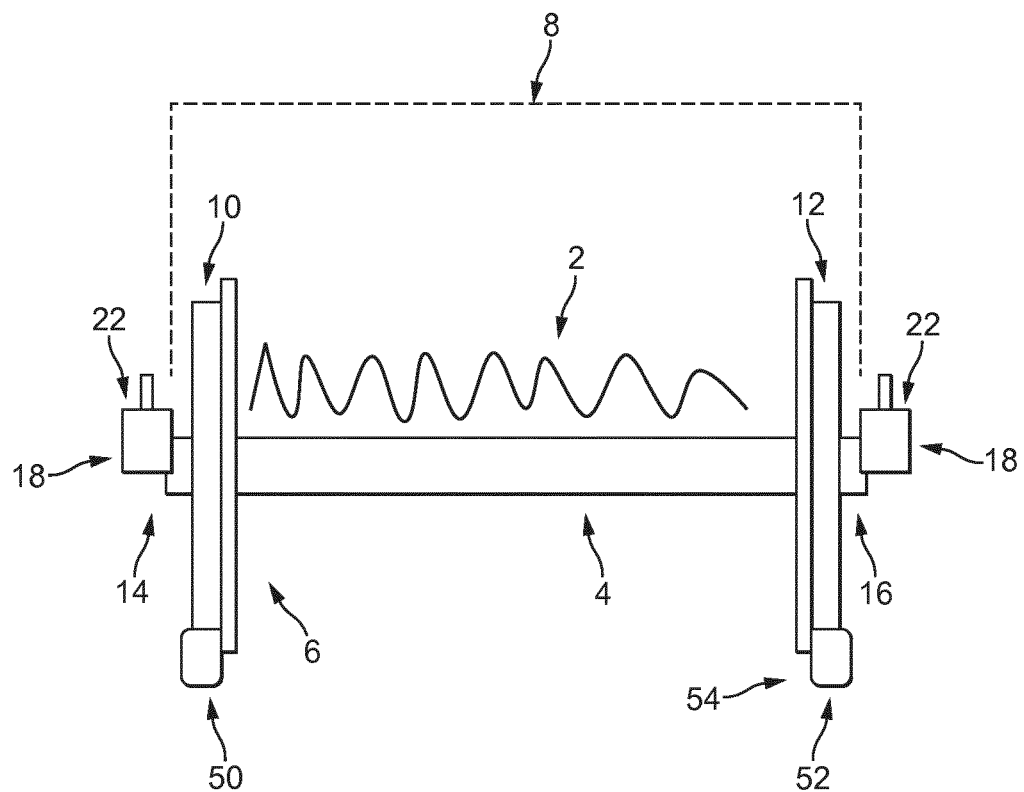
FIG. 1 is a schematic end view of an apparatus for monitoring a component of a wheelset assembly of a railway vehicle according to an embodiment of the present invention.
Figure 2:
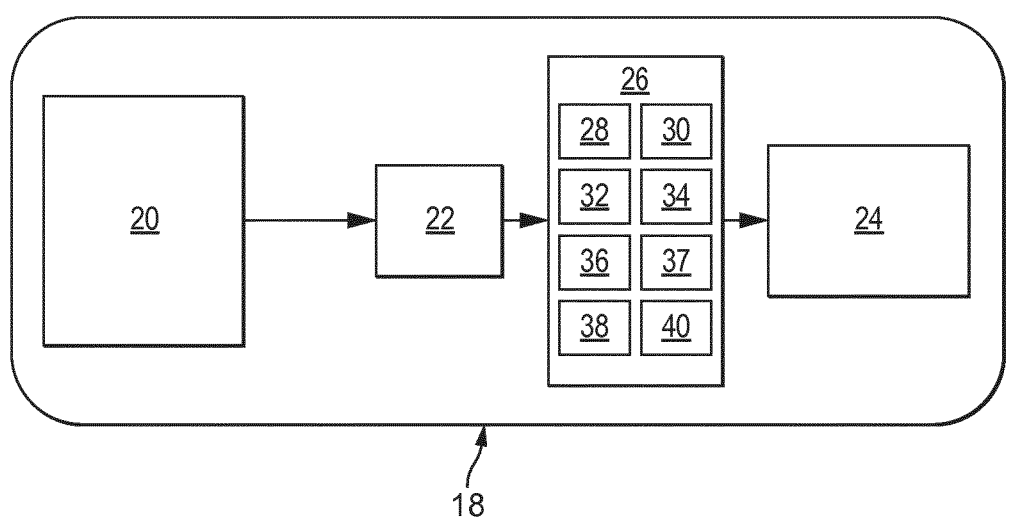
FIG. 2 is a schematic view of the processing system in the apparatus of FIG. 1.
Figure 3:
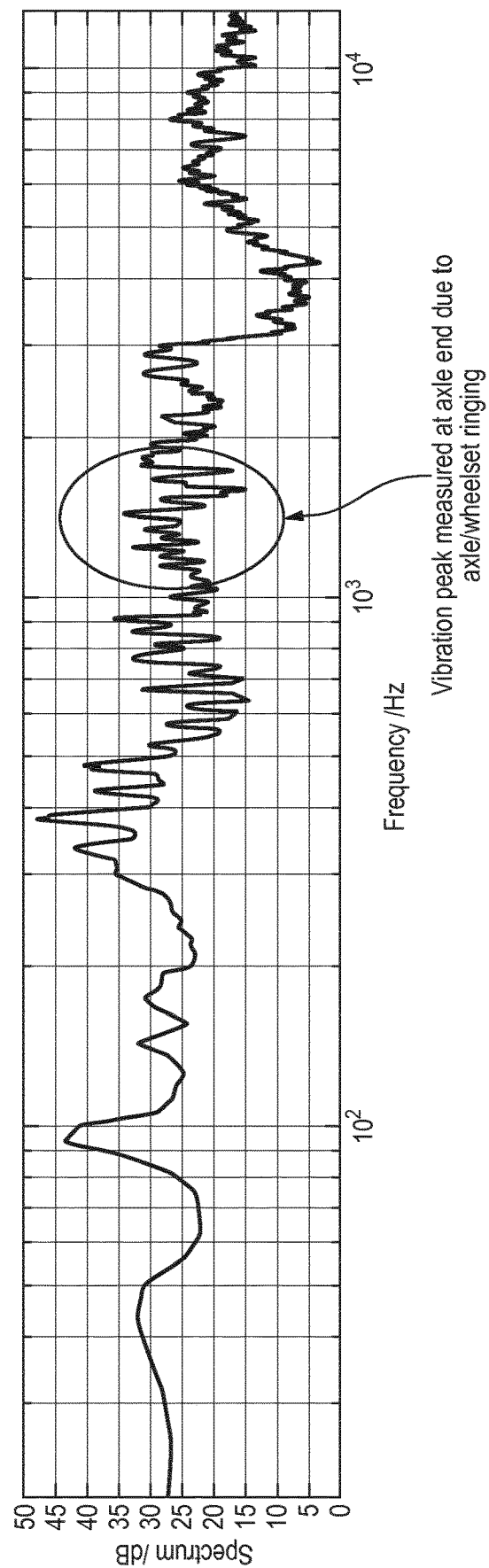
FIG. 3 is a schematic graph representing the output of the sensor in the apparatus of FIG. 1 when used for high bandwidth vibration measurements from an in-service passenger train.

Referring to FIGS. 1 to 3, there is shown an apparatus 2 for monitoring a component 4 of a wheelset assembly 6 of a railway vehicle 8. The railway vehicle 8 may be a locomotive, a passenger carriage or a freight car or truck. The wheelset assembly 6 comprises an axle 4, which is the component to be monitored, mounted between opposed wheels 10, 12, each wheel 10, 12 being fitted to a respective opposite end 14, 16 of the axle 4. In use, the wheels 10, 12 run on respective rails 50, 52 of a railway track 54.

A wireless sensor node 18 is fitted to the wheelset assembly 6. In the illustrated embodiment, the wireless sensor node 18 comprises a vibration energy harvester 20 for converting mechanical energy from vibration in the wheelset assembly 6 into electrical energy. A sensor 22 is provided for measuring a parameter, and in particular the sensor 22 is an accelerometer mounted to an end 14, 16 of the axle 4. A wireless transmitter 24 is provided for wirelessly transmitting the measured parameter or data associated therewith to a remote location for further processing and/or analysis; the remote location may be within the railway vehicle 8 which includes the tested wheelset assembly 6, or within a locomotive or other vehicle of a train which includes the wheelset assembly 6. Typically, each wheelset assembly 6 within a train is provided with a monitoring apparatus as described herein.

Preferably, as illustrated, the apparatus 2 comprises two of the wireless sensor nodes 18. Each wireless sensor node 18 is fitted to a respective opposite end 14, 16 of the axle 4, and each wireless sensor node 18 comprises a respective sensor 22 which is an accelerometer mounted to a respective end 14, 16 of the axle 4.

The apparatus 2 further comprises a processor 26 for processing the measured parameter to produce processed data. In the illustrated embodiment, the processor 26 is integral with the wireless sensor node 18, and the wireless transmitter 24 is arranged wirelessly to transmit the processed data. However, in alternative embodiments, the processor 26 is remote from the wireless sensor node 18, and the wireless transmitter 24 is arranged wirelessly to transmit the measured data which is then remotely processed by the processer 26 to produce the processed data.

The sensor 22 and processor 26 are arranged respectively to measure and process an axle percussion vibration, in particular the axle percussion vibration in the form of resonant vibration along the axle. The resonant vibration along the axle is typically within a frequency range of from 1000 to 2000 Hz, more typically from 1250 to 1750 Hz, for example about 1500 Hz.

The sensor 22 measures the percussion vibration, and from that measurement the frequency of the percussion vibration is determined. The determined frequency is dependent upon the axle condition and the axle load.

The processor 26 includes a baseline module 28 which is adapted to predetermine a baseline for the axle percussion vibration, a baseline comparator module 30 to compare a current axle percussion vibration against the predetermined baseline and an analyser module 32 to determine a parameter of the current axle percussion vibration from the comparison. That parameter comprises part of the processed data. Typically, the wireless sensor node 18 is adapted to be operated continuously over a monitoring period thereby continuously to measure the axle percussion vibration and continuously to compare the axle percussion vibration at any given time against a baseline value.

These components permit an axle percussion vibration frequency value to be continuously measured and compared against a baseline to eliminate or minimise background noise. The measured frequency value can be employed to provide an indication of axle condition in real-time and during service of the wheelset assembly 6.

In the preferred embodiments, the processor 26 includes a load calculator module 34 which comprises a comparison module 36 to compare a frequency of the axle percussion vibration against a predetermined reference frequency value associated with an axle load and a calculation module 37 to calculate a load on the axle based on the comparison.

These components permit an axle percussion vibration frequency value to be continuously measured and compared against a calibrated reference value to provide an indication of axle load in real-time and during service of the wheelset assembly 6.

As described above, preferably, as illustrated, the apparatus 2 comprises two of the wireless sensor nodes 18. These nodes 18 can be operated independently. The apparatus 2 may further include a measurement comparison module 38 in the processor 26 to compare a first frequency of the axle percussion vibration measured by the sensor 22 of a first wireless sensor node 18 against a second frequency of the axle percussion vibration measured by the sensor 22 of a second wireless sensor node 18. A comparison output module 40 in the processor 26 is provided to calculate the resonant vibration along the axle 4 based on the comparison. The measurement comparison module 38 is adapted to compare different ratios of one or more harmonic frequencies of the axle percussion vibration measured by the respective sensors 22 of the first and second wireless sensor nodes 18.

The apparatus 2 is used in a method of monitoring a component, in particular the axle 4, of the wheelset assembly 6.

In the method, a wireless sensor node 18 as described above is fitted to the wheelset assembly 6, so that the sensor 22, in particular the accelerometer, is mounted to an end 14, 16 of the axle 4. As described above, in the preferred embodiment there are two wireless sensor nodes 18 each fitted to the wheelset assembly 6, so that each respective sensor 22 is mounted to a respective end 14, 16 of the axle 4.

While the railway vehicle is in motion, the vibration energy harvester 20 receives input vibration energy which is converted into electrical energy to power the wireless transmitter 24. When the processor 26 is integrated into the wireless sensor node 18 the vibration energy harvester 20 can provide the electrical energy to operate the processor 26. The vibration energy harvester 20 can provide the electrical energy to operate any other powered components of the wireless sensor node 18.

Also while the railway vehicle is in motion, during an in-service period, the axle percussion vibration is measured using the sensor 22 and the measured axle percussion vibration or data associated therewith is wirelessly transmitted using the wireless transmitter 24.

The sensor measures resonant vibration along the axle which is typically within a frequency range of from 1000 to 2000 Hz, more typically from 1250 to 1750 Hz, such as about 1500 Hz. The sensor 22 measures the percussion vibration, and from that measurement the frequency of the percussion vibration is determined. The determined frequency is dependent upon the axle condition and the axle load.

FIG. 3 is an example of a graph when the apparatus was used for high bandwidth vibration measurements from an in-service passenger train, the graph showing the relationship between sensor output, in dB, and frequency, in Hz. The graph shows the vibration spectrum of the sensor output, for one particular wheelset that was tested in-service using the apparatus of the present invention. In this example, a distinct vibration output peak profile was exhibited at a frequency centred about 1500 Hz. The percussion vibration from axles of train wheelsets typically fall within this range, although the vibration output peak profile may vary between axles and wheelsets.

The measured axle percussion vibration, in particular data of the resonant vibration along the axle 4, is processed by the processor 26, which is either integral to, or remote from, the wireless sensor node 18, to produce processed data which may include the frequency of the percussion vibration.

When the processed data is processed by the processor 26 which is integral with the wireless sensor node 18, the processed data is wirelessly transmitted.

The processing by the processor 26 is preferably carried out in real-time simultaneously with the measuring and transmitting steps to measure the axle percussion vibration and transmit the axle percussion vibration or data associated therewith.

In the preferred embodiment, wherein the processing step includes the sub-steps of (i) comparing a current axle percussion vibration against a predetermined baseline for the axle percussion vibration and (ii) determining a parameter of the current axle percussion vibration from the comparison, the parameter comprising part of the processed data. Preferably, the wireless sensor node is operated continuously over a monitoring period thereby continuously to measure the axle percussion vibration. During the processing, the axle percussion vibration frequency at any given time is continuously compared against a predetermined baseline value. In this way an axle percussion vibration frequency value can be continuously measured and compared against a baseline to eliminate or minimise background noise, and provide an accurate value of the percussion vibration frequency of the axle which can provide a status indication of the axle. This can be used to analyse whether or not cracks or other faults are present in the axle.

The method and apparatus can also be used to measure axle load. The processing step (e) preferably includes the sub-steps of (I) comparing a frequency of the axle percussion vibration against a predetermined reference frequency value associated with an axle load, and (II) calculating a load on the axle based on the comparison. This enables the measured percussion vibration frequency of the axle to be calibrated against a predetermined reference frequency value to enable axle load to be calculated.

When the apparatus comprises two wireless sensor nodes 18, each wireless sensor node 18 being fitted to a respective opposite end 14, 16 of the axle 4 described above, each wireless sensor node 18 is operated to measure a respective axle percussion vibration frequency value to provide data relating to the measured axle percussion vibration. In the processing step (e), preferably there are sub-steps of (x) comparing a first frequency of the axle percussion vibration measured by the sensor 22 of a first wireless sensor node 18 against a second frequency of the axle percussion vibration measured by the sensor 22 of a second wireless sensor node 18, and (y) calculating the resonant vibration along the axle based on the comparison. The comparison typically compares different ratios of one or more harmonic frequencies of the axle percussion vibration measured by the respective sensors 22 of the first and second wireless sensor nodes 18.

The preferred embodiments of the present invention provide an apparatus, and an associated method, that exploit the power available from vibration energy harvesters to monitor vibration that has not been studied in the prior art for the purpose of axle crack formation. In particular, percussion vibration on the axle is monitored. The percussion vibration causes the axle to "ring" at a resonant frequency. If the resonant frequency changes, or if the percussion vibration fails to cause the axle to "ring" at the desired resonant frequency, then a potential fault in the axle can be highlighted and investigated further. This monitoring protocol can be conducted in-service and in real-time.

The preferred embodiments of the present invention provide that the percussion vibration is excited by wheel-rail impacts, and occurs at the natural vibration, i.e. the resonant frequency, of the wheelset, which comprises the wheels and axle assembly, that is present when the assembly receives impact energy. Using vibration that is excited by wheel-rail impact to monitor the state of the axle is a novel approach to axle health/condition monitoring, which exhibits a number of technical advantages.

First, the percussion vibration frequency is axle load dependent, which thereby allows wagon and axle loads to be monitored.

Second, small changes in the state of the axle produce a change in the vibration frequency spectra that can be monitored, and so the apparatus and method have high sensitivity.

Third, the frequency output of percussion vibration is above other sources of vibration noise in the system, typically being about 1500 Hz, which provides a noiseless or low noise signal to be analysed.

Fourth, the percussion vibration frequency is independent of train speed, so can be separated from other noise sources.

Fifth, the continuous, or near-continuous, monitoring from a vibration powered wireless sensor node (WSN) permits the establishment of a baseline for the percussion vibration, to enable reliable analysis of the percussion vibration frequency for any given axle.

Sixth, correlation of the percussion vibration frequency over time with known loads permits calibration of the load sensing capabilities of the percussion vibration frequency, thereby permitting axle loads to the calculated.

Seventh, comparison of measurements made at both ends of the axle (for example of the different ratios of the harmonics) can enhance the sensitivity of the apparatus.

Eighth, long term measurements can build-up a consistent trend for variation with time of the percussion vibration frequency, further enhancing the sensitivity of the apparatus and method to achieve reliable axle condition monitoring and axle load measuring.

Various modifications to the preferred embodiments of the present invention will be apparent to those skilled in the art.

The invention claimed is:

1. Apparatus for monitoring an axle of a wheelset assembly of a railway vehicle, the apparatus comprising a wireless sensor node fitted to a wheelset assembly, the wheelset assembly comprising an axle mounted between opposed wheels, each wheel being fitted to a respective opposite end of the axle, the wireless sensor node comprising a vibration energy harvester for converting mechanical energy from vibration in the wheelset assembly into electrical energy, a sensor for measuring a parameter, and a wireless transmitter for wirelessly transmitting the measured parameter or data associated therewith, and the apparatus further comprising a processor for processing the measured parameter to produce processed data, wherein the sensor is an accelerometer mounted to an end of the axle and the sensor and processor are arranged respectively to measure and process an axle percussion vibration frequency in the form of resonant vibration along the axle due to impacts on the wheelset assembly from a wheel/track interface, which resonant vibration occurs at the resonant frequency of the wheelset assembly which comprises the axle mounted between the opposed wheels.

2. Apparatus according to claim 1 wherein the processor is integral with the wireless sensor node, and the wireless transmitter is arranged wirelessly to transmit the processed data.

3. Apparatus according to claim 1 wherein the processor includes a baseline module which is adapted to predetermine a baseline for the axle percussion resonant vibration along the axle, a baseline comparator module to compare a current axle percussion resonant vibration along the axle against the predetermined baseline and an analyser module to determine a parameter of the current axle percussion resonant vibration along the axle from the comparison, the parameter comprising part of the processed data.

4. Apparatus according to claim 3 wherein the wireless sensor node is adapted to be operated continuously over a monitoring period thereby continuously to measure the axle percussion resonant vibration along the axle and continuously to compare the axle percussion resonant vibration along the axle at any given time against a baseline value.

5. Apparatus according to claim 1 wherein the processor includes a load calculator module which comprises a comparison module to compare a frequency of the axle percussion resonant vibration along the axle against a predetermined reference frequency value associated with an axle load and a calculation module to calculate a load on the axle based on the comparison.

6. Apparatus according to claim 1 wherein the apparatus comprises two of the wireless sensor nodes, each wireless sensor node being fitted to a respective opposite end of the axle, and each wireless sensor node comprises a sensor which is an accelerometer mounted to a respective end of the axle.

7. Apparatus according to claim 6 wherein the apparatus further includes a measurement comparison module in the processor to compare a first frequency of the axle percussion resonant vibration along the axle measured by the sensor of a first wireless sensor node against a second frequency of the axle percussion resonant vibration along the axle measured by the sensor of a second wireless sensor node and a comparison output module in the processor to calculate the resonant vibration along the axle based on the comparison.

8. Apparatus according to claim 7 wherein the measurement comparison module is adapted to compare different ratios of one or more harmonic frequencies of the axle percussion resonant vibration along the axle measured by the respective sensors of the first and second wireless sensor nodes.

9. Apparatus according to claim 1 wherein the railway vehicle is a locomotive, a passenger carriage or a freight car or truck.

10. Apparatus according to claim 1 wherein the frequency range is from 1000 to 2000 Hz.

11. Apparatus according to claim 10 wherein the frequency range is from 1250 to 1750 Hz.

12. A method of monitoring an axle of a wheelset assembly of a railway vehicle, the wheelset assembly comprising an axle mounted between opposed wheels, each wheel being fitted to a respective opposite end of the axle, the method comprising the steps of:
  a. providing a wireless sensor node fitted to the wheelset assembly, the wireless sensor node comprising a vibration energy harvester for converting mechanical energy from vibration in the wheelset assembly into electrical energy, a sensor for measuring a parameter, wherein the sensor is an accelerometer mounted to an end of the axle, and a wireless transmitter for wirelessly transmitting the measured parameter or data associated therewith;
  b. while the railway vehicle is in motion, the vibration energy harvester receiving input vibration energy which is converted into electrical energy to power the wireless transmitter;
  c. while the railway vehicle is in motion, measuring an axle percussion resonant vibration frequency, due to impacts on the wheelset assembly form a wheel/track interface, using the sensor, wherein the sensor measures resonant vibration along the axle and the resonant vibration occurs at the resonant frequency of the wheelset assembly which comprises the axle mounted between the opposed wheels;

d. while the railway vehicle is in motion, wirelessly transmitting the measured axle percussion resonant vibration frequency or data associated therewith using the wireless transmitter; and e. processing the measured axle percussion vibration frequency of the resonant vibration along the axle to produce processed data.

13. A method according to claim 12 wherein in step (e) the processed data is processed by a processor which is integral with the wireless sensor node, and in step (d) the processed data is wirelessly transmitted.

14. A method according to claim 12 wherein the processing step (e) is carried out in real-time simultaneously with steps (c) and (d).

15. A method according to claim 12 wherein the processing step (e) includes the sub-steps of (i) comparing a current axle percussion resonant vibration along the axle against a predetermined baseline for the axle percussion resonant vibration along the axle and (ii) determining a parameter of the current axle percussion resonant vibration along the axle from the comparison, the parameter comprising part of the processed data.

16. A method according to claim 15 wherein the wireless sensor node is operated continuously over a monitoring period thereby continuously to measure the axle percussion resonant vibration along the axle and in step (e) the axle percussion resonant vibration along the axle at any given time is continuously compared against a predetermined baseline value.

17. A method according to claim 12 wherein the processing step (e) includes the sub-steps of (I) comparing a frequency of the axle percussion resonant vibration along the axle against a predetermined reference frequency value associated with an axle load, and (II) calculating a load on the axle based on the comparison.

18. A method according to claim 12 wherein in step (a) the apparatus comprises two of the wireless sensor nodes, each wireless sensor node being fitted to a respective opposite end of the axle, each wireless sensor node comprising a respective sensor which is an accelerometer mounted to a respective end of the axle, and each wireless sensor node is operated to measure a respective axle percussion resonant vibration frequency value to provide data relating to the measured axle percussion resonant vibration frequency.

19. A method according to claim 18 wherein the processing step (e) includes the sub-steps of (x) comparing a first frequency of the axle percussion resonant vibration along the axle measured by the sensor of a first wireless sensor node against a second frequency of the axle percussion resonant vibration along the axle measured by the sensor of a second wireless sensor node and (y) calculating the resonant vibration along the axle based on the comparison.

20. A method according to claim 18 wherein sub-step (x) comprises comparing different ratios of one or more harmonic frequencies of the axle percussion resonant vibration along the axle measured by the respective sensors of the first and second wireless sensor nodes.

21. A method according to claim 12 wherein the railway vehicle is a locomotive, a passenger carriage or a freight car or truck.

22. A method according to claim 12 wherein the resonant vibration along the axle is within a frequency range of from 1000 to 2000 Hz.

23. A method according to claim 22 wherein the frequency range is from 1250 to 1750 Hz.

* * * * *